United States Patent

Gysling

[15] 3,666,204

[45] May 30, 1972

[54] MAGNETIC TAPE TRANSPORT

[72] Inventor: Walter Gysling, Excelsior, Minn.

[73] Assignee: Data Action Corporation, Minneapolis, Minn.

[22] Filed: Dec. 7, 1970

[21] Appl. No.: 95,545

[52] U.S. Cl. ....................242/189, 274/11 D

[51] Int. Cl. ....................B65h 59/38, G03b 1/04, B65h 63/02

[58] Field of Search ....................242/189–191; 318/6; 274/4 D, 11 D

[56] References Cited

UNITED STATES PATENTS

| | | | |
|---|---|---|---|
| 3,045,937 | 7/1962 | Johnson | 242/190 |
| 3,544,037 | 12/1970 | Arent | 242/189 |
| 3,601,333 | 8/1971 | Du Bois | 242/189 |
| 3,258,214 | 6/1966 | Comstock | 242/189 X |

*Primary Examiner*—Leonard D. Christian
*Attorney*—Merchant & Gould

[57] ABSTRACT

A high speed tape transport in which a pair of rotatably mounted tension arms move into engagement with information bearing tape as it passes between an electromagnetic tape head and, first and second tape reels to form tension loops and thereby maintain constant tape tension. The position of the tension arms is controlled by an actuating element which is connected to each of the arms and is reversibly movable along a line equidistant between the two tape reels. The tension arms are initially positioned outside the normal tape path in order to simplify the tape threading process and rotate inwardly through the path to form the tension loops. A beginning and end of tape sensor mounted adjacent the electromagnetic tape head is movable toward and away from the tape head as a function of tension arm position also for the purpose of simplifying tape threading process.

14 Claims, 9 Drawing Figures

INVENTOR.
WALTER GYSLING
BY
Merchant & Gould
ATTORNEYS

INVENTOR.
WALTER GYSLING
BY
Merchant & Gould
ATTORNEYS

INVENTOR.
WALTER GYSLING
BY
Merchant & Gould
ATTORNEYS

MAGNETIC TAPE TRANSPORT

The invention is directed to high speed tape transports having means for maintaining essentially constant tension on the tape during operation.

One of the primary objectives of the invention is to provide a tape transport in which tape from a previously mounted supply reel is quickly threaded through a simple tape path relative to an electromagnetic tape head and on to a take-up reel. Transport of the tape from the supply to the take-up reel is preceded by actuation of apparatus for maintaining constant tension in the tape, which comprises a pair of rotatably mounted tension arms having tape engaging portions which are normally positioned on one side of the normal tape path, and are movable through the path between tape guides to form tension loops in the tape. The mechanism controlling movement and position of the tension arms is unique in that the force necessary to move the arms remains essentially constant throughout the operation, notwithstanding the existence of springs for normally biasing each of the tension arms to a desired position. This is brought about through use of an actuating element which is reversibly movable along a line equidistantly disposed between the supply and take-up reels. Linkage interconnects each of the tension arms with the actuating element.

The preferred embodiment also includes a beginning and end of tape sensor which is disposed adjacent the electromagnetic tape head. This device senses a point on the tape at its beginning or end and operates to stop the capstan drive until further signal is given. The beginning and end of tape sensor is pivotally movable with respect to the electromagnetic tape head in order to simplify the insertion of tape therebetween. The sensor position is automatically correlated to the tension arm position to further simplify the tape threading process.

DESCRIPTION OF THE PREFERRED EMBODIMENT

Figures 1, 4, 5, 6, 7:
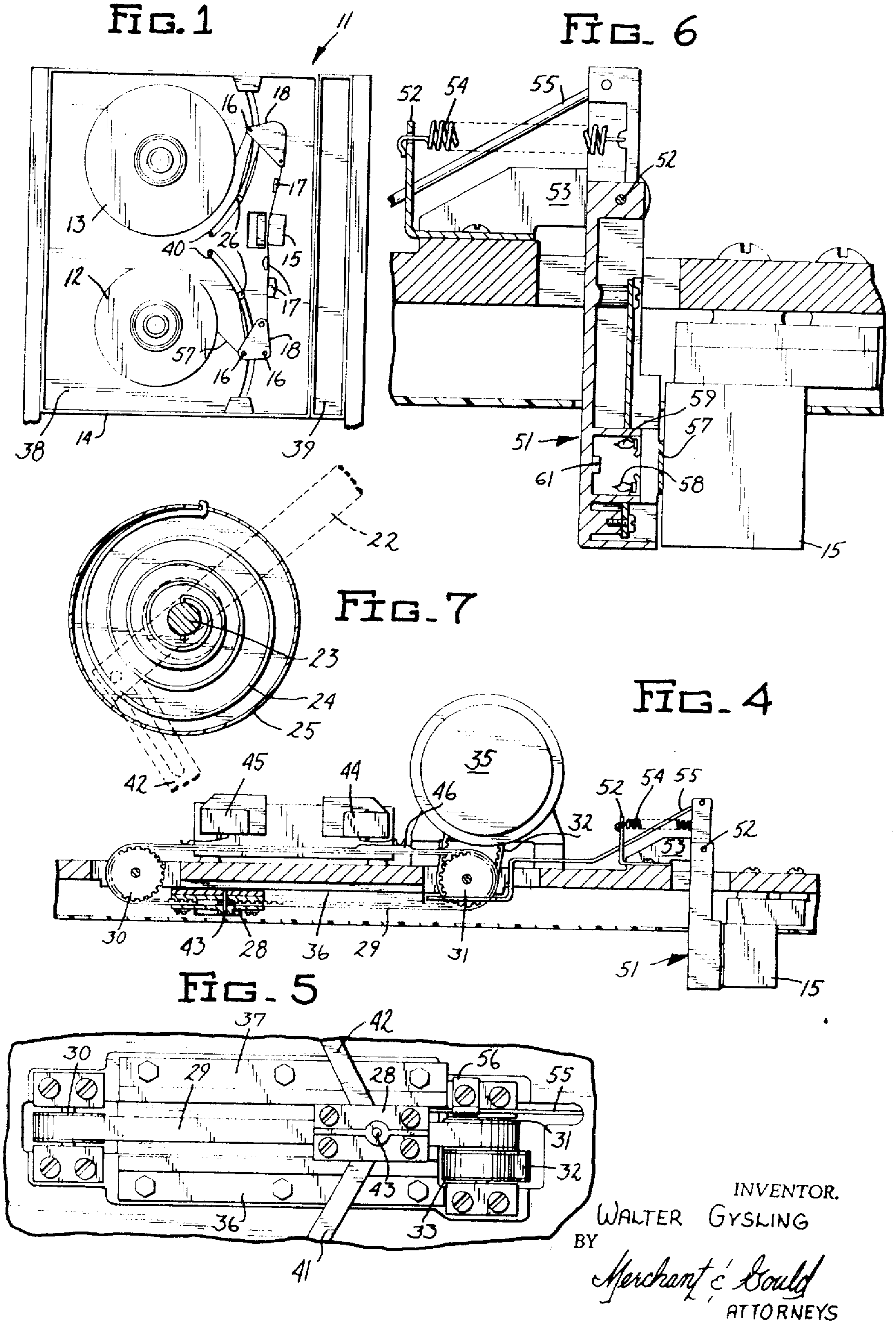
FIG. 1 is a front elevation of a tape transport embodying the inventive principle.
FIG. 4 is a sectional view of the apparatus for controlling position of the tension arms and a beginning and end of tape sensor, part thereof being broken away.
FIG. 5 is an enlarged fragmentary view of a portion of the apparatus for controlling position of the tension arms.
FIG. 6 is an enlarged fragmentary view of the beginning and end of tape sensor as shown in FIG. 4.
FIG. 7 is an enlarged fragmentary view of the means for biasing the tension arms.
Figure 3:
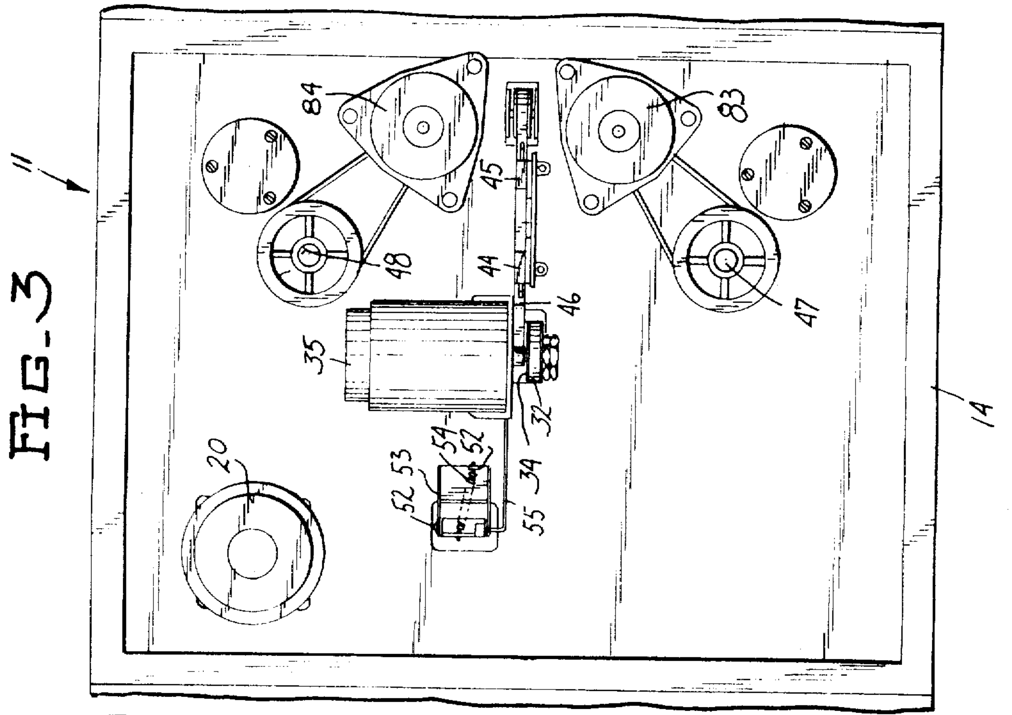
FIG. 3 is a rear elevation of the tape transport.

FIG. 1, a tape transport represented generally by the numeral 11 comprises a tape deck 14 having a facing panel 38 and a control panel 39. A pair of shafts 47 and 48 are rotatably mounted on tape deck 14, and are constructed to releasably receive a supply tape reel 12 and a take-up reel 13, respectively, Each of the reels 12, 13 is constructed to receive and store information-bearing magnetic tape, which moves between the reels over a predetermined path relative to an electromagnetic transducing head 15. The tape path is defined by a plurality of idlers 16 around which the tape travels, and a plurality of low friction guides 17 which maintain the proper angle of the tape as it approaches and leaves electromagnetic head 16. Idlers 16 may be covered, as at 18, for purposes of protection as well as ornamentation. A capstan 19 operates in association with one of the sets of idlers 16 to drive the magnetic tape through its predetermined path. As shown in FIG. 3, capstan 19 is driven by a motor 20 which is carried on the rear side of tape deck 14. Similarly supported are a pair of motors 83, 84 which, through endless belt and pulley combinations, drive rotating shafts 47, 48, respectively.

Figure 2:
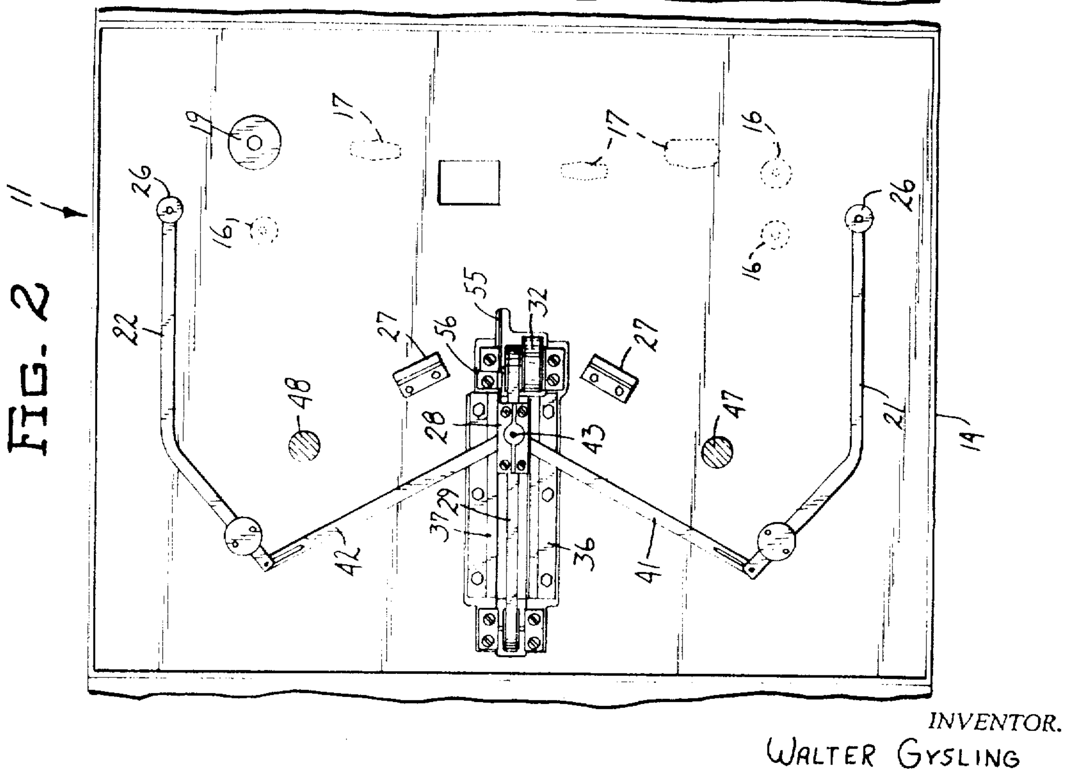
FIG. 2 is an enlarged front elevation of the tape transport with a front panel removed, showing with particularity a pair of rotatable tension arms and apparatus for controlling their position.

Referring additionally to FIG. 2, which is an enlarged view of FIG. 1 with face panel 38 and control panel 39 removed, transport 11 further comprises a pair of tension arms 21, 22 which are pivotally mounted to tape deck 14. As shown in FIG. 7, arms 21 and 22 are each mounted on a shaft 23 and are normally biased toward each other by a spiral spring 24 which is operatively connected between the tension arm and a fixed point on a spring enclosure 25 which is fastened to tape deck 14. The arms 21, 22 are angular as shown, and each includes a tape engaging roller 26 at its extreme end. The length and shape of tension arm 21 is chosen to permit the roller 26 to move from one side of the tape path to the other through idlers 16. Similarly, the roller 26 of tension arm 22 moves from one side of the tape path to the other between roller 16 and capstan 19. As shown in FIG. 1, rollers 26 project through arcuate grooves 40 formed in facing panel 38. A pair of resilient stop members 27 are positioned for arm limiting engagement should either of the tension arms 21–22 swing too far inward.

The position of tension arms 21 and 22 is determined by control apparatus the operation of which depends primarily on an actuating member 28, which is reversibly movable along a line disposed equidistantly between the shafts 23 about which arms 21 and 22 rotate. Referring additionally to FIGS. 4 and 5, actuating member 28 is affixed to a rubber timing belt 29 that rides on a pair of gears 30 and 31 which are journaled in tape deck 14. Timing belt 29 is driven by a second timing belt 32, which rides on a gear 33 rotating with gear 31 and a drive gear 34 mounted on the output shaft of a reversible electric motor 35.

Operation of motor 35 in the appropriate direction causes actuating member 28 to move with timing belt 29 in a linear manner. Lateral movement of actuating member 28 is limited by longitudinal members 36 and 37, which are fastened to the rear of the tape deck 14.

Actuating member 28 is operably connected to each of the tension arms 21, 22 by linkage members 41,42, respectively. The connection of each member 41, 42 to actuating member 28 is pivotal, as by a pin 43. The connection at the opposite end to the respective tension arms 21, 22 is likewise pivotal, but each of the linkage members 41, 42 is slotted to permit limited rotational movement of the arms once they have moved to the tape engaging position. This enables tape tension to remain essentially constant notwithstanding temporary variations in reel rotation.

One of the primary advantages of this structural arrangement results from the essentially constant load presented to the motor 35. This arises in part from the fact that the force-deflection characteristic of a spiral spring exhibits a particular linear range of operation in which the spring constant does not greatly exceed unity; i.e., the change in potential energy of the spring is slight with respect to a corresponding substantial increase in spring displacement. Thus, the forces involved through its range of operation do not change significantly.

Secondly, it is evident that the force necessary to move tension arms 21, 22 is greatest when the angle between the arms and their associated linkage member 41, 42 is smallest (when the arms are in an inward position). However, it is also true that actuating member 28 has its greatest mechanical advantage at this point since it is disposed perpendicularly to the linkage members 41, 42. As actuating member 28 moves away from this position, its mechanical advantage decreases because the angle that its path of movement forms with the linkage members is greater than 90°. Simultaneously, the respective angles between the tension arms and linkage members increase, which decreases the force necessary to rotate the arms. Consequently, the load on motor 35 remains essentially constant, which minimizes power requirements and optimizes motor operating efficiency.

Returning to FIG. 4, a pair of microswitches 44, 45 mounted on the rear portion of the tape deck form part of the apparatus for controlling the position of tension arms 21, 22. Microswitches 44 and 45 operate in conjunction with a switch tripper 46 which is mounted on the back side of timing belt 29, and serves to stop motor 35 when arms 21 and 22 have reached the proper position. Switches 44 and 45 also denote what position the arms 21, 22 are in so that at the proper time motor 35 can be controlled to return the tension arms to the opposite position.

Referring to FIGS. 4 and 6, tape transport 11 includes a device 51 for sensing the beginning or end of tape as it passes transducing head 15. Device 51 is an elongated hollow member pivotally connected by a pin 52 to a bracket 53 carried by tape deck 14, and is thus movable between a point away from transducing head 15 and a point adjacent head 15, as shown in FIGS. 4 and 6. A spring 54 connected between device 51 and bracket 52 normally biases device 51 to the closer position.

Also connected to device 51 is a formed rod 55 which, at its opposite end, is slidably carried by a retaining clip 56, as best shown in FIG. 5. As positioned, rod 55 is engagable by actuating member 28 as it moves to retract arms 21 and 22. As rod 55 is engaged, it slides to the right and permits device 51 to pivot away from transducing head 15 against the bias of spring 54. This greatly simplifies the placement of a length of magnetic tape 57 with respect to transducing head 15 during the tape threading process.

Device 51 houses a magnetic shield, a lamp 61 and a pair of photosensitive devices 58, 59, which are positioned with respect to lamp 61 in order that light reflected by a small metallic strip on one side of tape 57 will be sensed. The output of devices 58 and 59 is used to control the capstan motor 20 so that upon reaching either the beginning or end section of a particular reel of tape, transport 11 is brought to a halt pending a further signal.

Figure 8:
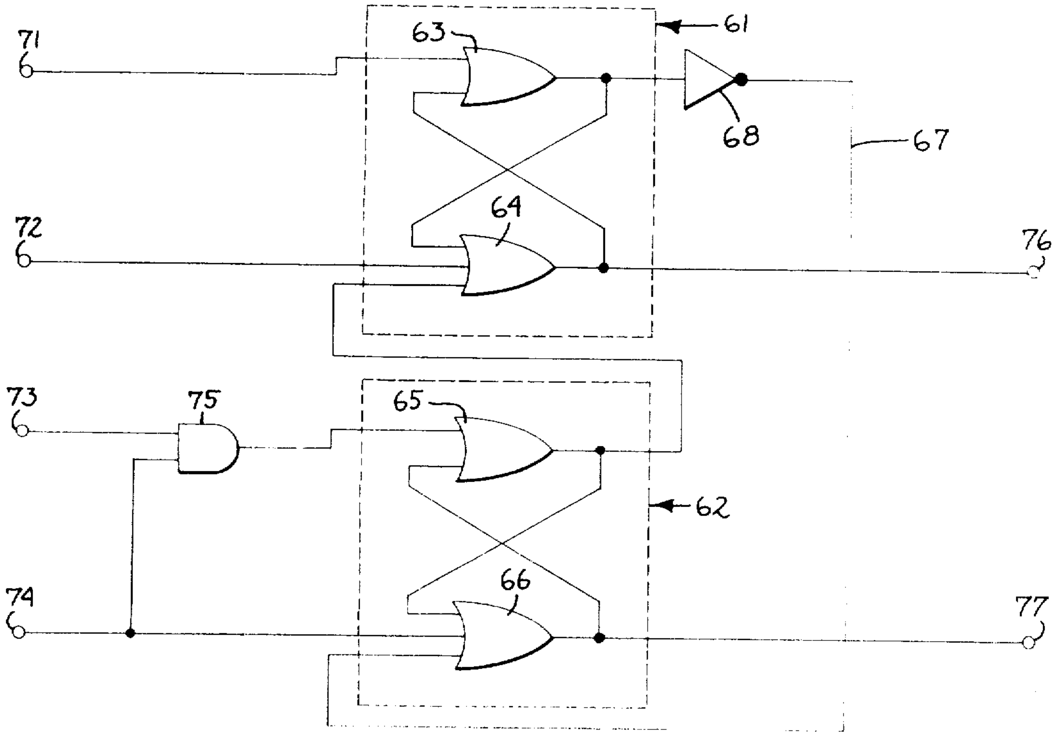
FIG. 8 is a schematic representation of a logic circuit which in part controls the tension arm position.
Figure 9:
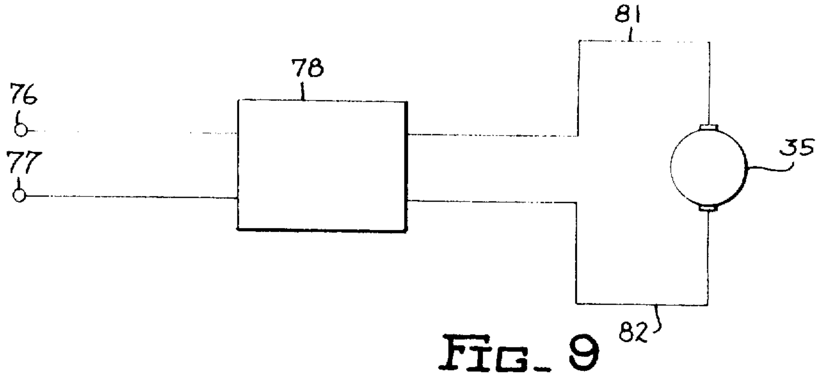
FIG. 9 is a schematic representation of an additional part of the control circuit.

FIGS. 8 and 9 disclose the circuitry operatively connecting the transport controls, microswitches 44, 45 and reversible motor 35. FIG. 8 discloses a pair of conventional flip-flop logic circuits 61 and 62 each of which comprises a pair of NOR gates 63, 64 and 65, 66, respectively. One of the outputs of flip-flop 61 is connected by means of a conductor 67 including an inverter 68 to the input of flip-flop 62. Similarly, one of the outputs of flip-flop 62 is connected to the input of flip-flop 61 by a conductor 69 including an inverter 70.

Flip-flop 61 has two primary input terminals 71 and 72. Terminal 71 is connected to a "retract" switch on the transport control panel 39 (not shown), and terminal 72 is connected to microswitch 45. Similarly, flip-flop 62 has an input terminal 73 connected to a "load" or "start" switch on control panel 39 (not shown), and a terminal 74 which is connected to microswitch 44. As indicated, the conductors leading from terminal 73 and 74 are connected to a NAND gate 75 the output of which serves as one of the inputs to flip-flop 62. Flip-flops 61 and 62 each have a primary output terminal, numbered 76 and 77, respectively, which, as shown in FIG. 9, serve as the input to a circuit 78 for controlling reversible motor 35. The operation of motor control circuit 78 is such that a signal of predetermined polarity across output conductors 81 and 82 of circuit 78 drives motor 35 in a direction which causes tension arms 21 and 22 to move from the outward position to the inward position. A signal at terminal 76 causes motor control circuit 78 to drive reversible motor 35 in the opposite direction to retract the tension arms 21 and 22.

In operation, it is initially assumed that tension arms 21 and 22 are positioned with roller 26 disposed outside the normal tape path, with device 51 accordingly positioned away from transducing head 15. Supply reel 12 is mounted on shaft 47, and take-up reel 13 is placed on its rotating shaft 48. Tape is then easily drawn around rollers 16, guide members 17, over transducing head 15, around guide 17 and between capstan 19 and its associated idler 16 before being fed onto take-up reel 13.

Having assumed that tension arms 21 and 22 were in their retracted or outer position, it is evident from FIG. 4 that switch tripper 46 must be in contact with microswitch 45. Accordingly, of the input terminals 71–74 of the control circuit only terminal 72 is receiving an input signal, and flip-flops 61–62 are set to an initial "reset" state. If the load switch is depressed, the output of flip-flop 62 changes state and provides a signal at terminal 77 for motor control circuit 78. Motor 35 is thus powered to drive timing belts 29 and 32 and move tension arms 21 and 22 from the retracted to the inward or tape tension position, thereby forming tension loops in the tape (FIG. 1). In so doing, tripper 46 moves away from and "opens" microswitch 45. As arms 21, 22 approach their inward position, tripper 46 engages and "makes" microswitch 44 which changes the state of flip-flop 62 and removes the signal from terminal 77. This causes motor 35 to stop with arms 21, 22 in the tape tension position.

This movement of timing belt 29 also results in actuating member 28 moving away from rod 55, which permits spring 54 to pivot sensing device 51 to its operating position adjacent transducing head 15. Thus, upon the application of power to capstan motor 20, device 51 is capable of sensing the beginning or end of a reel of tape and controlling capstan motor 20 accordingly.

Retraction of tension arms 21 and 22 is effected by actuation of the retraction switch, which results in changing the state of flip-flop 61 and providing an output signal at terminal 76. The output of motor control circuit 78 is reversed in polarity, and motor 35 repositions tension arms 21 and 22 through the reverse movement of timing belts 29, 32 actuating member 28. This movement initially "opens" microswitch 44 and subsequently "makes" microswitch 45. This again changes the state of flip-flop 61, and the output signal appearing at terminal 76 is removed to stop motor 35. At this time, both flip-flops 61 and 62 are returned to the initial "reset" state in which they can respond to actuation of the load switch.

Retraction also causes actuating member 28 to move into engagement with rod 55 and thereby pivot sensing device 51 away from transducing head 15 against the bias of spring 54. This permits simple removal of the tape and prepares the unit for receipt of and threading of another reel of tape.

What is claimed is:

1. Apparatus for transporting information bearing tape, comprising:

a tape deck;

means supported by the tape deck for rotatably receiving a first tape reel;

means supported by the tape deck for rotatably receiving a second tape reel in a predetermined position relative to the first tape reel;

transducer means disposed in a predetermined position relative to the first and second reels;

means for guiding the tape through a predetermined normal path relative to the transducer means to effect a transfer of information therebetween;

first and second tension arms pivotally mounted on the tape deck, each arm having a tape engaging portion movable between first and second positions disposed on opposite sides of the normal tape path;

means normally biasing the first and second tension arms toward the second position;

and control means for moving the tension arms between the first and second positions, comprising an actuating member carried by the tape deck and movable along a line extending between the respective reel receiving means;

means for reversibly moving the actuating member along said line;

and linkage means connecting the actuating member with each of the first and second tension arms.

2. The apparatus as defined by claim 1, wherein the means for reversibly moving the actuating member comprises an endless belt disposed on the line extending between the respective reel receiving means, and reversible motor means operably connected to the endless belt.

3. The apparatus as defined by claim 2, and further comprising:

switch means for starting and stopping the reversible motor means;

and means carried by the endless belt and disposed to actuate the switch means in a predetermined manner.

4. The apparatus as defined by claim 3, wherein the switch means enunciates the position of the tension arms.

5. The apparatus as defined by claim 1, wherein:

the linkage means are rigid;

the connection between the linkage means and the tension arms is pivotal;

and further comprising means for permitting limited rotational movement of the tension arms with respect to the linkage means when in the tape engaging position.

6. The apparatus as defined by claim 5, wherein each linkage means includes a longitudinal slot in its outer end to permit said limited rotational movement, the pivotal connection being slidably movable in the longitudinal slot.

7. The apparatus as defined by claim 1, and further comprising:

means disposed opposite the transducer means for sensing movement of a particular section of tape thereby;

the sensing means being pivotally mounted on the tape deck for movement between a position adjacent the transducer means and a position removed from the transducer means;

and second linkage means operably connecting the tape sensing means with the tension arm control means.

8. The apparatus as defined by claim 7, wherein the second linkage means is constructed and arranged to move the tape sensing means to the position adjacent the transducer means when the tension arms are moved to the second position.

9. The apparatus as defined by claim 7, and further comprising means for normally biasing the tape sensing means toward the position adjacent the transducer means.

10. The apparatus as defined by claim 7, wherein the second linkage means comprises a rod slidably carried by the tape deck and having one end operably connected to the tape sensing means, the opposite end of the rod being disposed for engagement by the means for reversibly moving the actuating member to effect sliding movement of the rod.

11. The apparatus as defined by claim 1, wherein the tension arm biasing means comprises a spiral spring.

12. The apparatus as defined by claim 1, and further comprising stop means for limiting excessive rotational movement of the tension arms beyond the second position.

13. The apparatus as defined by claim 1, wherein the tape guiding means comprises a pair of spaced, low-friction guide members, and the tape engaging portion of a tension arm is disposed for movement between the spaced guide members to engage the tape and thereby form tension loops therein.

14. The apparatus as defined by claim 1, wherein the linkage means is essentially perpendicular to the respective tension arms and said line extending between the respective reel receiving means when the tension arms are in the second position.

* * * * *